(12) United States Patent
Mulcahy et al.

(10) Patent No.: US 9,542,207 B2
(45) Date of Patent: *Jan. 10, 2017

(54) PLURALITY OF INTERFACE FILES USABLE FOR ACCESS TO BIOS

(71) Applicant: HEWLETT-PACKARD DEVELOPMENT COMPANY, L.P., Houston, TX (US)

(72) Inventors: Luke Mulcahy, Houston, TX (US); Bernard D. Desselle, Spring, TX (US); Christoph J. Graham, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 117 days.

This patent is subject to a terminal disclaimer.

(21) Appl. No.: 14/603,762

(22) Filed: Jan. 23, 2015

(65) Prior Publication Data
US 2015/0143093 A1 May 21, 2015

Related U.S. Application Data

(63) Continuation of application No. 13/384,597, filed as application No. PCT/US2009/054964 on Aug. 25, 2009, now Pat. No. 8,972,708.

(51) Int. Cl.
G06F 9/445 (2006.01)
G06F 9/455 (2006.01)

(52) U.S. Cl.
CPC .......... *G06F 9/44505* (2013.01); *G06F 9/455* (2013.01)

(58) Field of Classification Search
CPC .................................. G06F 9/44; G06F 9/445
See application file for complete search history.

(56) References Cited

U.S. PATENT DOCUMENTS 7,047,497 B2 5/2006 Patrizio et al.
2002/0078292 A1 6/2002 Chilton
2002/0103997 A1 8/2002 Merkin
(Continued)

FOREIGN PATENT DOCUMENTS

CN 101432690 5/2009

OTHER PUBLICATIONS

HPDC, International Search Report & Written Opinion dated May 10, 2010, PCT App. No. PCT/US2009/054964, 14 p.
(Continued)

*Primary Examiner* — Phil Nguyen
(74) *Attorney, Agent, or Firm* — HP Inc. Patent Department

(57) ABSTRACT

A computer may comprise a processor and first storage device coupled to the processor. The first storage device contains a basic input/output system (BIOS) executable by the processor. The system may also comprise a second storage device coupled to the processor. The second storage device may contain a management interface usable by an operating system to access the BIOS. A plurality of interface files may also be provided, each interface file being usable by the management interface to access the BIOS and each interface file defining one or methods for use by the interface or BIOS. Upon execution of the BIOS, the processor is to determine a configuration of the system and, based on the determined configuration, to select a particular interface file for use during run-time.

8 Claims, 4 Drawing Sheets

(56) References Cited

U.S. PATENT DOCUMENTS

| | | |
|---|---|---|
| 2003/0097555 A1* | 5/2003 | Cheston .............. G06F 9/4448 713/2 |
| 2003/0188293 A1 | 10/2003 | Boucher |
| 2004/0002982 A1 | 1/2004 | Ersek et al. |
| 2005/0060575 A1 | 3/2005 | Trethewey et al. |
| 2005/0283599 A1 | 12/2005 | Zimmerman et al. |
| 2006/0184794 A1 | 8/2006 | Desselle et al. |
| 2007/0255936 A1 | 11/2007 | Stemen |
| 2008/0162914 A1 | 7/2008 | Adrangi et al. |
| 2009/0177877 A1 | 7/2009 | Holdaway et al. |

OTHER PUBLICATIONS

Microsoft, "Windows Instrumentation: WMI and ACPI," Dec. 4, 2001, 13 p.

Wikipedia, "System Management BIOS," Wikipedia, the free encyclopedia, Aug. 2, 2009, 1 p.

Wikipedia, "Windows Management Instrumentation," Wikipedia, the free encyclopedia, Nov. 21, 2008, 6 p.

\* cited by examiner

PLURALITY OF INTERFACE FILES USABLE FOR ACCESS TO BIOS

CROSS-REFERENCE TO RELATED APPLICATIONS

This application is a continuation of U.S. patent application Ser. No. 13/384,597, filed Jan. 17, 2012, titled "Plurality of Interface Files Usable for Access to BIOS," which is the U.S. National Stage under 35 U.S.C. §371 of International Patent Application No. PCT/US2009/054964, filed Aug. 25, 2009, which are hereby incorporated herein by reference in their entirety for all purposes.

BACKGROUND

A computer system includes a basic input/output system (BIOS) which provides access to low level hardware devices such as keyboards, disk drives, etc. In some systems, an interface, such as the Windows Management Instrumentation (WMI), provides the operating system with access to the BIOS. An interface file, such as a managed object format (MOF) file, is also provided to provide access by the operating system to the BIOS. A MOF file describes classes and methods that are available to the operating system and any applications running thereon. The WMI interface defines the interface to BIOS, and the MOF file defines the data structures and the methods that are supported by the BIOS.

BRIEF DESCRIPTION OF THE DRAWINGS

For a detailed description of illustrative embodiments of the invention, reference will now be made to the accompanying drawings in which.

DETAILED DESCRIPTION

Different configurations of computer systems have different low level functionality. For example, one computer system might have temperature sensors while another computer system does not. The BIOS in the former computer system would provide support to access the temperature sensors. The BIOS in the latter computer system (no temperature sensors) would not need to provide such support.

The MOF file typically is compiled before its installation in the computer system and thus before the computer is assembled from its constituent parts. Computers usually do not have the ability to edit or replace their MOF file with a new MOF file. Because, the MOF file is static and because a variety of computer system configurations are generally made available in the computer market, in at least some instances, a MOF file that can support any computer system configuration is included in each computer system. Such a MOF file may provide support for a device (e.g., a temperature sensor) or other type of configuration element (e.g., security credential) that may not exist in the particular system in which that MOF file is used.

In accordance with various embodiments, a plurality of interface (MOF) files are provided in non-volatile storage of an electronic system such as a computer. Logic, such as the BIOS of the system, is executed by the processor to determine the configuration of the system and selects an appropriate interface file from among the multiple possible interface files and uses the selected interface file to permit the operating system or applications running under the operating system to access the BIOS. In other embodiments, an uncompiled interface file is provided from which, based on the system configuration, a suitable compiled interface file is generated.

Figure 1:
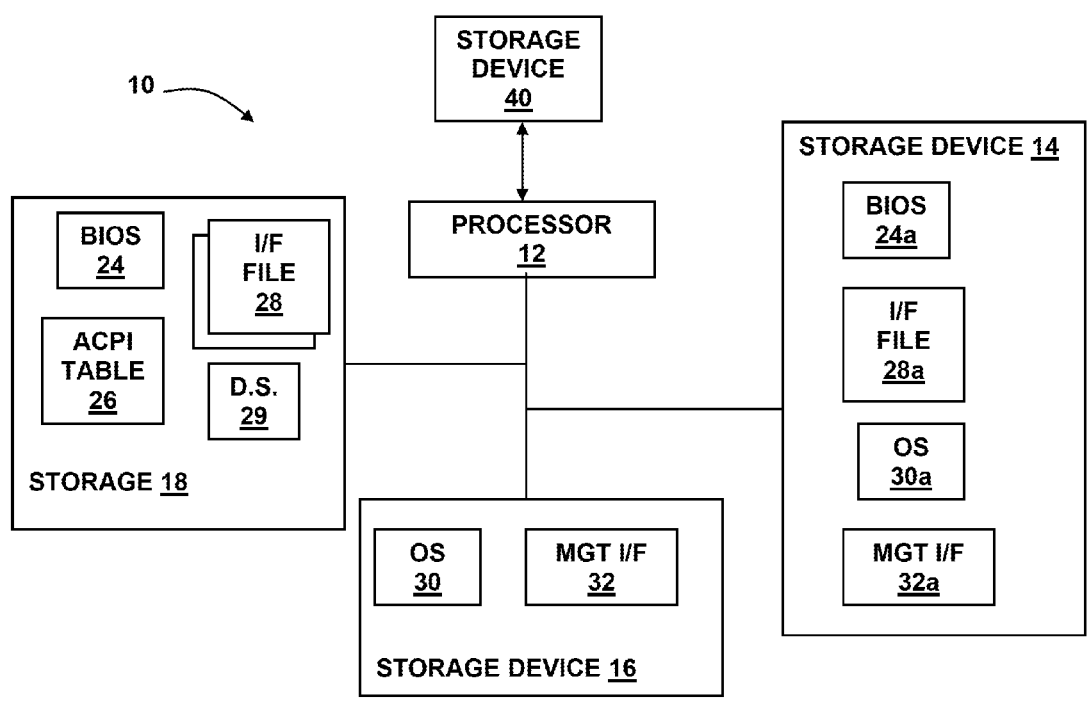
FIG. 1 shows a system in accordance with various embodiments.

FIG. 1 shows a system 10 in accordance with various embodiments. The system illustrated in FIG. 1 is that of a computer, but may be representative of other types of systems in other embodiments. As shown, system 10 comprises a processor 12 coupled to three storage devices 14, 16, and 18. Storage device 14 comprises volatile storage such as random access memory and as such is referred to as "memory." Storage device 16 comprises non-volatile storage such as a hard disk drive (HDD) 16 and is referred to as a "HDD." Storage device 18 also comprises non-volatile storage such as any form of read-only memory (ROM) and as such is referred to as a "ROM." The ROM 18 may comprise a non-programmable ROM, a programmable ROM (PROM), an electrically-erasable PROM (EEPROM), and the like. The ROM 18 stores the system's basic input/output system (BIOS) 24 and may also be referred to as the "system ROM." Any one or a combination of the storage devices 14-18 are referred to herein as computer-readable storage media.

The BIOS 24 comprises code that is executed by the processor 12 during system initialization to perform a power-on self-test (POST). The BIOS 24 also comprises code that provides access to various hardware devices including, for example, keyboard, mouse, temperature sensors, disk drives, etc. During or after boot-up of the system 10, the BIOS 24 in accordance with at least some embodiments is copied to memory 14 and executed from memory 14 thereafter. The copy of BIOS 24 in memory 14 is represented as BIOS 24a in FIG. 1.

The various storage devices 14-18 couple to the processor through one or more busses and/or intervening logic (e.g., a bridge device). While one illustrative architecture for system 10 is shown in FIG. 1, in other embodiments, different architectures can be used.

Referring still to FIG. 1, the HDD 16 stores an operating system (OS) 30 and a management interface 32. The OS 30 and management interface 32 comprise code that is executable by the processor 12. The OS 30 provides a platform on which one or more applications can execute. The management interface 32 provides an interface usable by the OS 30 to access the BIOS 24 (references herein to BIOS 24 include BIOS 24a as well). In accordance with at least one embodiment, the OS 30 comprises the WINDOWS® or WINDOWS VISTA® operating systems and the management interface comprises the Windows Management Instrumentation (WMI) both from Microsoft Corp. Upon boot-up of system 10, the OS 30 and management interface 32 are copied to memory 14 and are illustrated in FIG. 1 as OS 30a and management interface 32a. References herein to OS 32 include the copy of the OS in memory 14 (OS 30a). Similarly, references herein to management 32 include the copy of the management interface in memory 14 (management interface 32a).

In the embodiment of FIG. 1, the system ROM 18 also stores a plurality of interface files 28. In other embodiments, the interface files 28 are stored elsewhere besides on the system ROM 18. Each interface file 28 describes classes and methods that are available to the OS 32 and any applications running thereon. In accordance with at least one embodiment, each interface file 28 is a management object format (MOF) file. In accordance with various embodiments, during system initialization or boot-up, the processor 12 of system 10 determines the system's configuration and selects an interface file 28 suitable for that particular configuration. The selected interface file 28 is selected for use during run-time (after the operating system has loaded) of system 10 and copied to storage device 14 for subsequent use from storage device 14. The copy of the interface file in storage device 14 is represented as interface file 28a in FIG. 1. In accordance with at least some embodiments, the use of the selected interface file 28 may be as follows: the OS 32, or an application running under the OS 32, may initiate a request for data or call for a particular method to the management interface 32 for data. The management interface 32 generates a system management interrupt (SMI) which, in turn, is processed by the BIOS 24. BIOS 24 retrieves the requested data or performs the called method, and provides the retrieved data or status resulting from the execution of the called method to the logic (OS 32 or application) that initiated the access to BIOS in the first place. The interface files 28 shown in the example of FIG. 1 are pre-compiled files. That is, the interface files 28 stored on system ROM 18 were compiled prior to being loaded onto system ROM 18. Once an interface file 28 is selected, that file then can be executed without having to compile the file as the file is already compiled in this embodiment.

The processor 12 can determine the configuration of the system 10 in accordance with any of a variety of techniques. For example, one or more non-volatile storage devices 40 (e.g., complementary metal oxide semiconductor (CMOS) storage devices) may store some or all, of the configuration information associated with the system 10, or at least enough of the configuration sufficient for the selection of the interface file 28. Such configuration information may include, for example, presence of hardware devices such as a case lock and/or temperature sensors, verified security credentials, and the operating system executing in the system 10.

In accordance with another embodiment, the configuration of the system 10 can be determined by the BIOS 24 issuing calls to all possible configuration elements for each such element, if present, or associated logic to reply to the call with information indicating whether that element is present. If the element is present, the element will reply to the call; if the element is not present, no reply will be issued. For example, the BIOS 24 may issue calls to all hardware devices that conceivably may be present in the system to ascertain whether each such device is present or absent. Further, BIOS 24 may issue calls to detect the presence or absence of non-hardware configuration elements such as security credentials.

Via whatever mechanism or procedure is used to determine the configuration of the system 10, the interface file 28 most suitable for use in a system with that particular configuration is selected for use. In some embodiments, a data structure 29 (e.g., a look-up table) may be stored in the system ROM 18. Such a data structure 29 may provide a mapping between various configurations and interface files 28. Thus, upon determining the configuration for system 10, the data structure 29 is accessed to look-up the corresponding interface file. In other embodiments, logic that selects the correct interface file 28 for a given configuration may be hard-coded into code such as BIOS 24.

In some embodiments, the system ROM 18 also stores an Advanced Configuration Power Interface (ACPI) differentiated system description table 26. The interface file 28 is selected for use in some embodiments by embedding in the ACPI table 26 a secondary system description table containing the selected MOF file.

The selected interface file 28 is used during run-time (i.e., after the OS 30 begins to execute) to enable the OS 30 to access the BIOS 24. For example, the interface file 28 allows users to perform various actions through interaction with the OS such as changing BIOS configuration options, viewing temperature sensor data, performing security operations, etc.

Figure 2:
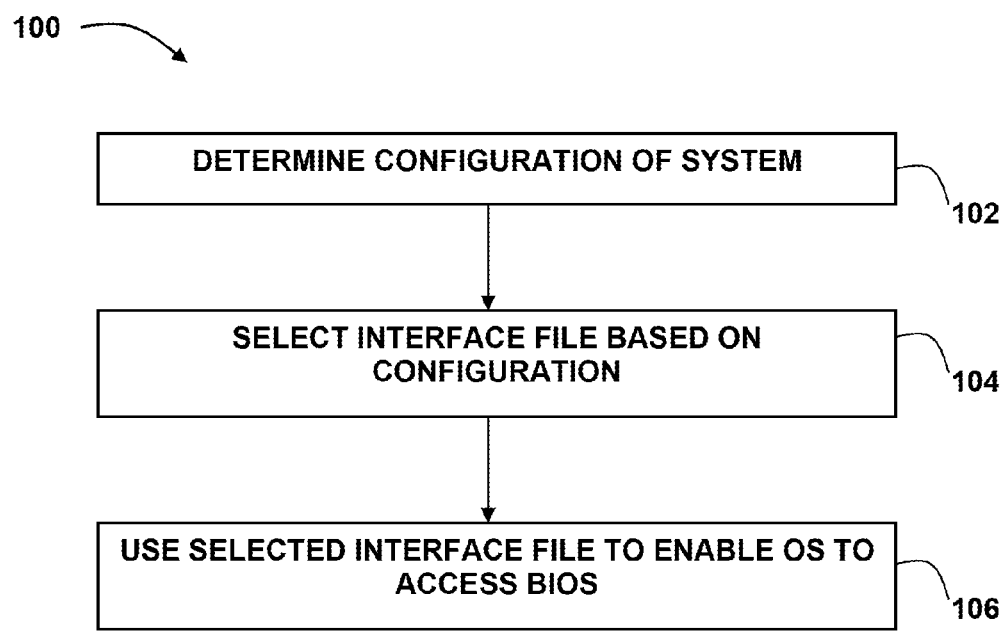
FIG. 2 shows a method in accordance with various embodiments.

FIG. 2 illustrates a method 100 implemented on system 10. Each action depicted in FIG. 2 is performed by the processor 12 in accordance with at least some embodiments. At 102, the processor 12 determines the configuration of the system 10. At 104, one of the plurality of interface files is selected by the processor 12 based on the system's configuration. At 106, the processor 12 retrieves and uses the selected interface file to enable the OS 30 to access the BIOS 24 during run-time.

Figure 3:
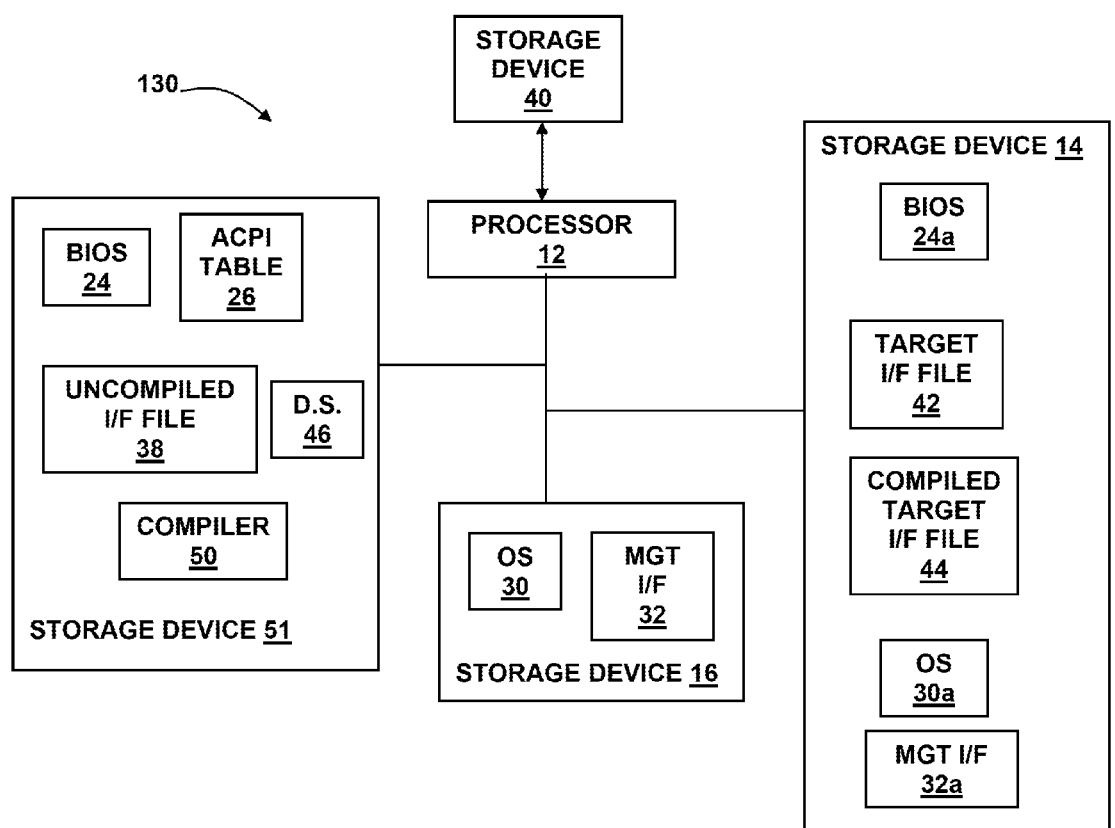
FIG. 3 shows a system in accordance with another embodiment.

As noted above, the interface files shown in FIG. 1 may have been compiled prior to being loaded onto system ROM 18. In other embodiments, the interface files 28 may not be pre-compiled and may be plain text files that will need to be compiled by system 10 prior to being used. In some embodiments, system ROM 18 stores only a single, uncompiled interface file. FIG. 3 illustrates an embodiment of a system 130 in which an uncompiled interface file 38 is stored on a system ROM 51. The system ROM 51 in this embodiment comprises BIOS 24, ACPI table 26, a data structure 46, and a compiler 50 as shown.

Figure 4:
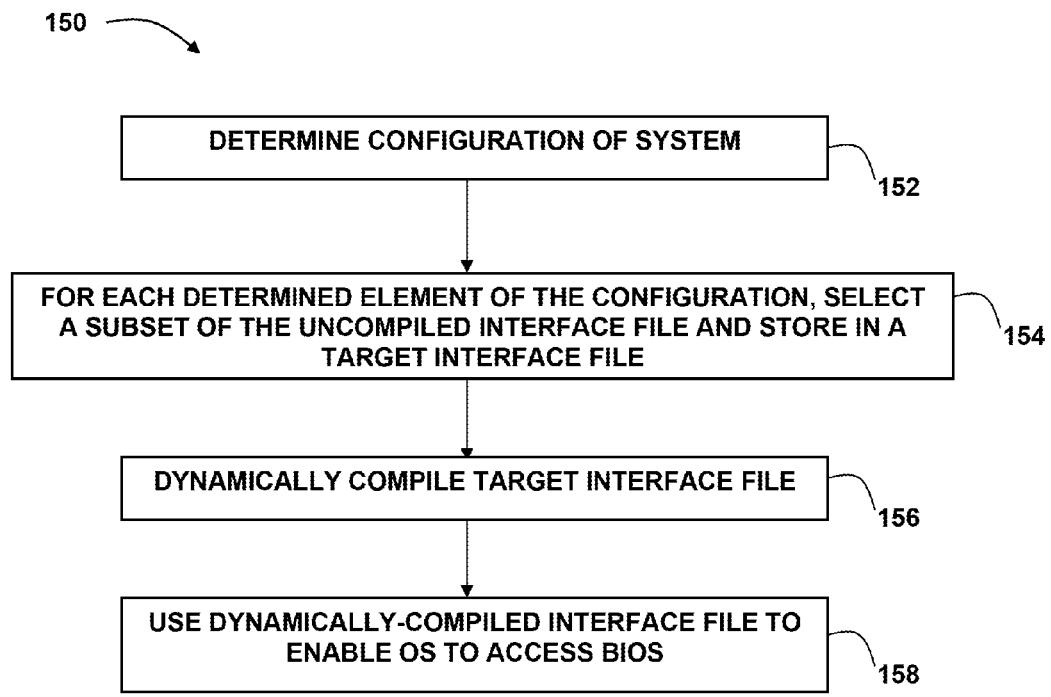
FIG. 4 shows a method in accordance with another embodiment.

FIG. 4 illustrates a method 150 for use with an uncompiled interface file 28. The method 150 in FIG. 4 (discussed in reference to FIG. 3 as well) is performed by the processor 12 in accordance with at least some embodiments. At 152, the configuration of the system 130 is determined as explained previously. At 154, for each configuration element of the configuration so determined, the method comprises selecting a subset of the uncompiled interface file 38 and storing said selected subset to a target interface file 42 created in memory 14 and dynamically assembled during system configuration or during run-time. A particular configuration element can be mapped to a section of the text of the interface file 38, at 154. For example, at 152 it may be determined that a temperature sensor is present in the system 130. If a temperature sensor is present, it can be mapped to a section of the uncompiled interface file 38 that relates to accessing and using such a temperature sensor. In some embodiments, a data structure (D.S.) 46 is provided on, for example, system ROM 51. Such data structure 46 maps the configuration elements to the corresponding portions of the interface file 38.

Once the target interface file 42 is created in memory 14 from the uncompiled interface file 38, the target interface file 42 is compiled (156) to produce compiled target interface file 44. A compiler such as a MOF compiler may be provided on system ROM 18 for this purpose. At 158, the dynamically-compiled interface file 44 is used as explained previously.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer, comprising:

a processor;

first storage device coupled to said processor, said first storage device containing a basic input/output system (BIOS) executable by said processor;

second storage device coupled to said processor, said second storage device containing a management interface usable by an operating system to access said BIOS; and a plurality of interface files stored in said computer, each interface file usable by said management interface to access said BIOS and each interface file defining one or more methods for use by said management interface;

wherein, upon execution of said BIOS, said processor is to determine a configuration of said computer, by accessing a value from a third storage device, and, based on said determined configuration, to select a particular interface file for use during run-time.

2. The computer of claim 1 wherein said first storage device contains said plurality of interface files.

3. The computer of claim 1 wherein said plurality of interface files comprises managed object format (MOF) files.

4. The computer of claim 1 wherein each of said plurality of interface files is compiled before storage on said computer.

5. The computer of claim 1 wherein said first storage device is a read-only memory and said plurality of interface files are contained on said read-only memory with said BIOS.

6. A computer, comprising:

a processor;

first storage device coupled to said processor, said first storage device containing a basic input/output system (BIOS) executable by said processor, a plurality of compiled interface files, each interface file defining classes and methods for accessing the BIOS, and a data structure that includes a mapping between computer configurations and individual interface files; and second storage device coupled to said processor, said second storage device containing a management interface usable by an operating system to access said BIOS;

wherein, upon execution of said BIOS, said processor is to determine a configuration of said computer and, based on said the mapping in the data structure, to select a particular interface file from among the plurality of interface files for use during run-time and copy the selected interface file from the first storage device to a different storage device.

7. The computer of claim 6 wherein the plurality of interface files comprises managed object format (MOF) files.

8. The computer of claim 6 wherein, upon execution of the BIOS, the processor is to determine the configuration by accessing a value from a third storage device.

* * * * *